US008055302B2

(12) United States Patent
Chen et al.

(10) Patent No.: US 8,055,302 B2
(45) Date of Patent: Nov. 8, 2011

(54) FULL FREQUENCY SCANNING METHOD AND CHANNEL PARAMETER ADJUSTING METHOD FOR SMART ANTENNA

(75) Inventors: Chien-Tsun Chen, Taipei (TW); Tien-Hsin Kuo, Taipei (TW)

(73) Assignee: ALi Corporation, Taipei (TW)

( * ) Notice: Subject to any disclaimer, the term of this patent is extended or adjusted under 35 U.S.C. 154(b) by 543 days.

(21) Appl. No.: 12/345,422

(22) Filed: Dec. 29, 2008

(65) Prior Publication Data

US 2010/0087158 A1 Apr. 8, 2010

(30) Foreign Application Priority Data

Oct. 8, 2008 (CN) .......................... 2008 1 0149838

(51) Int. Cl.
*H04M 1/00* (2006.01)

(52) U.S. Cl. ........................ 455/562.1; 455/25; 455/269

(58) Field of Classification Search .................... 455/25, 455/161.1, 161.2, 161.3, 164.1, 173.1, 269, 455/275, 276.1, 562.1
See application file for complete search history.

(56) References Cited

U.S. PATENT DOCUMENTS

| | | | | |
|---|---|---|---|---|
| 7,098,847 | B2 * | 8/2006 | Li | 342/368 |
| 7,136,113 | B2 | 11/2006 | Lee | |
| 7,236,759 | B2 * | 6/2007 | Cha et al. | 455/275 |
| 7,242,424 | B2 | 7/2007 | Lee | |
| 7,346,365 | B1 * | 3/2008 | Hovers et al. | 455/550.1 |
| 7,444,157 | B2 * | 10/2008 | Hovers et al. | 455/562.1 |

* cited by examiner

*Primary Examiner* — Jeffrey Zweizig
(74) *Attorney, Agent, or Firm* — J.C. Patents

(57) ABSTRACT

An adjusting method for a smart antenna is provided. The adjusting method divides all possible reading directions of the smart antenna into a plurality of scanning directions and a plurality of idle directions by a first form. In searching for the optimal parameters of each of a plurality of communication channels, the adjusting method firstly adjusts the reading direction according to the plurality of scanning directions, and then adjusts the reading direction according to the plurality of idle directions. Further, the first form remain updated in accordance the process of searching for the optimal parameters of each of the communication channels, thus effectively saving the time spent on the full frequency scanning process. Further, the optimal parameters of each of the communication channels are recorded in a second form, so that the smart antenna is regulated according to the second form.

11 Claims, 5 Drawing Sheets

FULL FREQUENCY SCANNING METHOD AND CHANNEL PARAMETER ADJUSTING METHOD FOR SMART ANTENNA

CROSS-REFERENCE TO RELATED APPLICATION

This application claims the priority benefit of Chinese application serial no. 200810149838.1, filed on Oct. 8, 2008. The entirety of the above-mentioned patent application is hereby incorporated by reference herein and made a part of this specification.

BACKGROUND OF THE INVENTION

1. Field of the Invention

The present invention generally relates to an adjusting method for a smart antenna, and more particularly, to an adjusting method adapted for saving a time spend by a smart antenna on a full frequency (channel) searching.

2. Description of Related Art

As the electronic science and technology being progressively developed, people have now become used to wireless communication. Therefore, an antenna often plays a key role in a wireless communication system, and even may be a critical part determining the overall performance of the system. Generally, omni-directional antennas and directional antennas are often interfered by multipath and co-channel signals, which disturb the transmission and restrict the system capacity of the wireless communication system.

As an ideal solution, the smart antenna technique has been proposed. Typically, a smart antenna is actually an antenna array including multiple sensors. In wireless communication, the smart antenna is adapted for extending the coverage of the base station, saving the power consumption, combating the multipath and co-channel interference, lowering the bit error rate, improving the resource utilization rate, and enhancing the system capacity. As such, the smart antennas are widely employed in different types of communication systems, such as: digital television systems, wireless local area networks, and global positioning systems.

Further, the smart antenna can be controlled by software to vary its parameters, such as direction, gain, and polarity, so as to achieve an improved signal receiving performance. Generally, when adjusting the parameters, a smart phone usually finds out optimal parameters of each of a plurality of communication channels by performing a full frequency search. A current full frequency searching method of the smart antenna is to search one by one all of the communication channels at all possible reading directions. However, such a searching process unavoidably consumes much time. Further, the smart antenna is also often affected by environmental variation or changed as time going by. For example, being moved or touched by others or even by wind, the smart antenna may be affected with variations of parameters. As such, it has become an important concern of the smart antenna to effectively adjust the parameters of the smart antenna, so as to improve the signal receiving performance thereof.

SUMMARY OF THE INVENTION

Accordingly, the present invention is directed to provide an adjusting method for a smart antenna, for saving time spent on a full frequency searching process, and for auto-tracking a status of a communication channel.

The present invention is further directed to provide a full frequency searching method, for saving time of a smart antenna spent on a full frequency searching process.

The present invention is further directed to provide a method for automatically tuning an optimal parameter of a communication channel, so as to improve the signal receiving performance of a smart antenna.

The present invention provides an adjusting method for a smart antenna. First, a plurality of scanning directions and a plurality of idle directions are obtained according to a first form. Then, a reading direction of the smart antenna is adjusted according to the scanning directions, and whether signals of a specific channel received by the smart antenna from the scanning directions satisfy a predetermined specification is determined.

Then, when the signals of the specific channel received by the smart antenna in the scanning directions fail to satisfy the predetermined specification, the reading direction of the smart antenna is adjusted according to the idle directions so as to determine whether signals of the specific channel received by the smart antenna from the idle directions satisfy the predetermined specification. Then, one of the idle directions is allocated to the scanning directions.

Further, when the signals of the specific channel received by the smart antenna in the scanning directions satisfy the predetermined specification, parameters of the smart antenna in its present condition are recorded in a second form and are defined as optimal parameters of the smart antenna for reading the specific channel. Correspondingly, the smart antenna can be adjusted according to the second form.

According to an embodiment of the present invention, the adjusting method for the smart antenna further includes the following steps. First, one of a plurality of communication channels is selected and serving as the specific channel. Whether all of the communication channels have been selected one by one is determined. When all of the communication channels have not been selected one by one, the step of selecting one of the communication channels is repeated. When all of the communication channels have been selected one by one, the step of adjusting the smart antenna according to the second form is executed.

According to an embodiment of the present invention, the adjusting method for the smart antenna further includes the following steps. A communication channel, which is presently read by the smart antenna, is selected from the communication channels and is defined as a default communication channel. Signals of the default communication channel read by the smart antenna are compared with a first specification and a second specification respectively. When the signals of the default communication channel read by the smart antenna fail to satisfy the first specification, a first information is displayed for optionally updating the optimal parameter of the communication channels of the second form. When the signals of the default communication channel read by the smart antenna fail to satisfy the second specification, a second information is displayed, and the parameter of the smart antenna is adjusted according to the second form and a plurality of deviation parameters.

The present invention further provides a full frequency scanning method, applicable for a smart antenna, including the following steps. First, the smart antenna scans signals of a first channel from a first direction of an idle direction. Whether the signals received by the smart antenna satisfied a predetermined specification is determined. When the signals received by the smart antenna fail to satisfy the predetermined specification, the smart antenna scans signals of the first channel in a second direction of the idle direction, and then the step of determining whether the signals received by the smart antenna satisfies a predetermined specification is repeated.

Further, when the signal received by the smart antenna satisfies the predetermined specification, the first direction is set as a scanning direction, and is recorded in a first form. Then, the smart antenna scans signals of a next channel (e.g., a second channel), according to the scanning direction recorded in the first form. Then, whether the signals received by the smart antenna satisfy the predetermined specification is determined. When the signals of the second channel at the scanning direction fail to satisfy the predetermined specification, the smart antenna scans signals of the second channel in the second direction of the idle direction. Correspondingly, when the signals of the second channel received in the scanning direction satisfy the predetermined specification, the step of scanning signals of a next channel is repeated until all of the channels are scanned.

The present invention further provides a method for adjusting a channel parameter, applicable for a smart antenna, including the following steps. When signals of a specific channel read by the smart antenna satisfy a first specification, parameters of the smart antenna in its present condition are recorded in a second form and are defined as optimal parameters of the specific channel. Then, whether the signals of the specific channel under the optimal parameters satisfy a second specification is determined. When the signals of the specific channel under the optimal parameters fail to satisfy the second specification, a first information is displayed, and parameters of the smart antenna are adjusted according to the second form and a plurality of deviation parameters. Further, when the signals of the specific channel under the optimal parameters satisfy the second specification, the parameters of the smart antenna are remained unchanged.

As discussed above, the present invention divides all possible reading directions of the smart antenna into a plurality of scanning directions and a plurality of idle directions by a first form. The first form is remained being updated by searching of the communication channels. Further, the present invention determines whether signals of a communication channel, which is being presently read by the smart antenna, satisfy the first specification and the second specification. In such a way, the present invention is adapted for effectively saving the time spent on the full frequency scanning process, and auto-tracking the status of the communication channels, and thus automatically tuning the optimal parameters of the communication channels.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
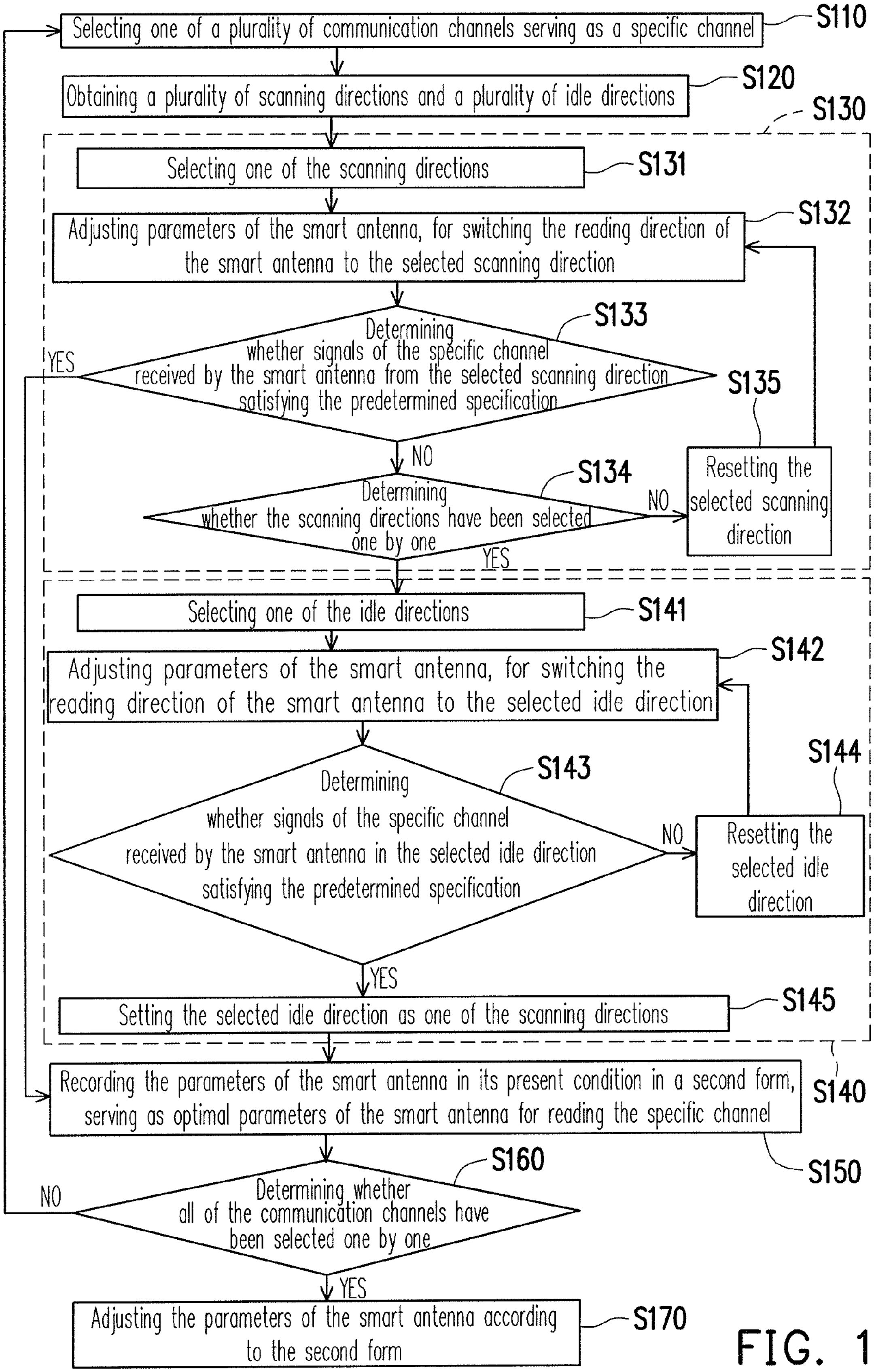
FIG. 1 is a flow chart illustrating a part of an adjusting method of a smart antenna according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flow chart illustrating a part of an adjusting method of a smart antenna according to an embodiment of the present invention. Referring to FIG. 1, optimal parameters of each of a plurality of communication channels are obtained by executing step S110 through S160. Thereafter, the smart antenna can then be operated with the optimal parameters, thus achieving an improved signal receiving performance as desired.

Generally, the present invention searches a plurality of communication channels one by one. For example, if an operable frequency range of the smart antenna is 470 to 860 MHz and a frequency bandwidth for transmission is 6 MHz, the smart antenna will search 65 communication channels one by one. Central frequencies of the 65 communication channels are 473 MHz, 479 MHz, 485 MHz, 491 MHz, 497 MHz, . . . , 857 MHz.

Further referring to FIG. 1, firstly, one of the communication channels is selected and defined as a specific channel at step S110. For example, the communication channel which central frequency is 473 MHz is selected and defined as the specific channel. After the optimal parameter corresponding to the communication channel which central frequency is 473 MHz is recorded in the second form by performing the subsequent steps S120 to S150, it will be determined at step S160 that the 65 communication channels have not been selected one by one. In this case, the communication channel which central frequency is 479 MHz is set as the specific channel, and then the steps S120 to S160 are repeated. The flow is going so forth until optimal parameters of all of the 65 communication channels are obtained by repetitively executing the steps S110 to S160.

With respect to the scanning process of each of the communication channels, at step S120, a plurality of scanning directions and a plurality of idle directions are obtained according to a first form. In the current embodiment, the scanning directions are defined as directions from which the smart antenna finds out communication channels, and the idle directions are defined as directions other than the scanning directions. It should be notice that the scanning directions and the idle directions as set forth in the first form vary from the setting of the optimal parameters of the communication channels. For example, the smart antenna is adapted for scanning 16 reading directions regarding each of the communication channels, respectively. The corresponding angles of 16 reading directions are 0°, 22.5°, 45°, 67.50°, 90°, . . . , 337.5°, respectively. The reading directions are directions of the communication channels to be scanned. In the current embodiment, the reading directions are exemplified with 16 directions, but the present invention is not restricted to 16 reading directions as exemplified hereby. When the communication channel which central frequency is 473 MHz is set as the specific channel, the smart antenna finds out the specific communication channel from a direction of the 22.5° angle, and then the direction of the 22.5° angle is recorded in the first form as a scanning direction.

Then, when the communication channel which central frequency is 479 MHz is set as the specific channel, at step S120, the 16 reading directions of the smart antenna are divided into scanning directions of the 22.5° angle and idle directions of the 0°, 45°, 67.50°, 90°, . . . , 337.5° angles, respectively, in the first form. The communication channel which central frequency is 479 MHz is to be exemplified below for illustrating the setting of the optimal parameters of the specific channel.

At step S130, the reading direction of the smart antenna is adjusted according to the canning directions to determine whether signals of the specific channel received by the smart antenna in the scanning directions satisfy a predetermined specification. For example, at step S131, one of the scanning directions is selected, e.g., the scanning direction of the 22.5° angle is selected.

Then, at step S132, the parameters of the smart antenna are adjusted to switch the reading direction of the smart antenna to the selected scanning direction (i.e., the scanning direction of the 22.5° angle hereby). Then, at step S133, whether signals of the specific channel (i.e., 479 MHz hereby) received by the smart antenna from the selected scanning direction (i.e., the scanning direction of the 22.5° angle hereby) satisfy the predetermined specification is determined. The predetermined specification for example is a definition related to a signal to noise ratio (SNR).

When the signals of the specific channel received from the selected scanning direction (i.e., 22.5° hereby) satisfy the predetermined specification, that means the signals presently received by the smart antenna are featured with good signal receiving performance, and thus the flow goes to step S150. On the other hand, when the signals of the specific channel received from the selected scanning direction (i.e., 22.5° hereby) fail to satisfy the predetermined specification, the scanning directions which have not been selected or the idle directions can be used for further test of the specific channel. In this case, step S134 will be executed, in which whether the scanning directions have been selected one by one is determined.

If the scanning directions have not been selected one by one, step S135 will be executed, in which the selected scanning direction is reset, and the steps S132 to S134 will be repeated until all of the reading directions of the smart antenna are switched to the scanning directions one by one. Correspondingly, if the scanning directions have been selected one by one, that means the smart antenna is incapable of receiving signals of the specific channel from the scanning directions.

In this case, the flow executes step S140, in which the reading directions are set in accordance with the idle directions. It should be noted that with respect to the communication channel which central frequency is 479 MHz, the corresponding scanning directions include the direction of the 22.5° angle only. Therefore, when the step S133 determines that signals of the communication channel which central frequency is 479 MHz fail to satisfy the predetermined specification, the flow goes to execute the step S140 according to the determination of step S134.

In other words, when signals of the specific channel received by the smart antenna from all of the scanning directions fail to satisfy the predetermined specification, step S140 will be executed. At step S140, the reading directions of the smart antenna are adjusted according to the idle directions, so as to determine whether signals of the specific channel received by the smart antenna from the idle directions satisfy the predetermined specification.

For example, with respect to the communication channel which central frequency is 479 MHz, the scanning directions corresponding thereto include 0°, 45°, 67.50°, 90°, . . . , 337.5°. Specifically, the step S140 further includes sub-steps as following. First at step S141, one is selected from the idle directions, e.g., the idle direction of the 0° angle. Then, at step S142, parameters of the smart antenna are adjusted, so that the reading direction of the smart antenna is switched to the selected idle direction (i.e., the idle direction of the 0° angle). Then, at step S143, it is determined that whether signals of the specific channel (e.g., 479 MHz) received by the smart antenna satisfy the predetermined specification or not.

When the signals of the specific channel received by the smart antenna in the selected idle direction (i.e., the idle direction of the 0° angle) fail to satisfy the predetermined specification, the idle directions which are not yet selected (e.g., 45°, 67.50°, 90°, . . . , 337.5°) are used to test signal quality of the specific channel. In this case, the flow executes step S144, in which the selected idle direction is reset, e.g., setting the selected idle direction as 45°, and steps S142 and S143 are repeated until the optimal parameters of the specific channel are achieved.

Correspondingly, when the signals of the specific channel received by the smart antenna in the selected idle direction (i.e., the idle direction of the 0° angle) satisfy the predetermined specification, it means the signals presently received by the smart antenna are featured in good signal receiving performance. Hence, the flow goes to execute step S150. Further, step S145 sets the presently selected idle direction (i.e., the idle direction of the 0° angle) as one of the scanning directions. In other words, the direction of the 0° angle is recorded as a scanning direction in the first form. In such a way, the first form is remained updated in accordance with the searching process of the communication channels, and therefore the smart antenna can spend less time to find out optimal parameters of subsequent communication channels.

In other words, when signals of the specific channel received by the smart antenna in one of the idle directions satisfy the predetermined specification, the step S140 updates the first form further to include the instant selected idle direction into the scanning directions.

Further, when signals of the specific channel received at the step S130 or the step S140 satisfy the predetermined specification, it means the signals presently received by the smart antenna are featured in good signal receiving performance, and thus the flow goes to step S150. At step S150, instant parameters (directions, polarities, gains . . . ) of the smart antenna in its present status are recorded in a second form, serving as optimal parameters of the smart antenna for reading the specific channel.

Until step S150, the flow has completed search for optimal parameters regarding one of the communication channels (e.g., 479 MHz). Subsequently, at step S160, it is determined that whether all of the communication channels (e.g., the aforementioned 65 communication channels) have been selected one by one. When the communication channels have not been selected one by one, it means searches of optimal parameters of all of the communication channels are not completed. In this case, the steps S110 to S160 will be repeated until all optimal parameters of each of the communication channels are recorded in the second form. Correspondingly, when all of the communication channels have been selected one by one, that means the search for optimal parameters of all of the communication channels are completed. Therefore, at step S170, the parameters of the smart antenna can be adjusted according to the second form, so that the smart antenna can achieve to improve the receiving performance of signal.

It should be noted that when searching for the optimal parameters of each of the communication channels, the flow of the current embodiment adjusts the reading directions of the smart antenna according to the scanning directions recorded in the first form. Then, the flow of the current embodiment adjusts the reading directions of the smart antenna according to the idle directions recorded in the first form. Further, if the optimal parameters of the communication channel are searched according to one of the idle directions, the idle directions will be allocated to the scanning directions.

In such a way, the first form is constantly updated according to the process of searching the communication channels, and therefore the subsequently selected communication channel can be searched by referring previous searching results. Accordingly, the subsequently selected communication channel has more chance to achieve its optimal parameters at step S130. In other words, it is unnecessary for the embodiments to test each of the communication channels according to all possible reading directions (including scanning directions and idle directions) of the smart antenna, for obtaining optimal parameters of each of the communication channels. In such a way, the embodiment of the present invention is adapted to effectively saving the time of the smart antenna spent on the full frequency scanning process.

Figure 2:
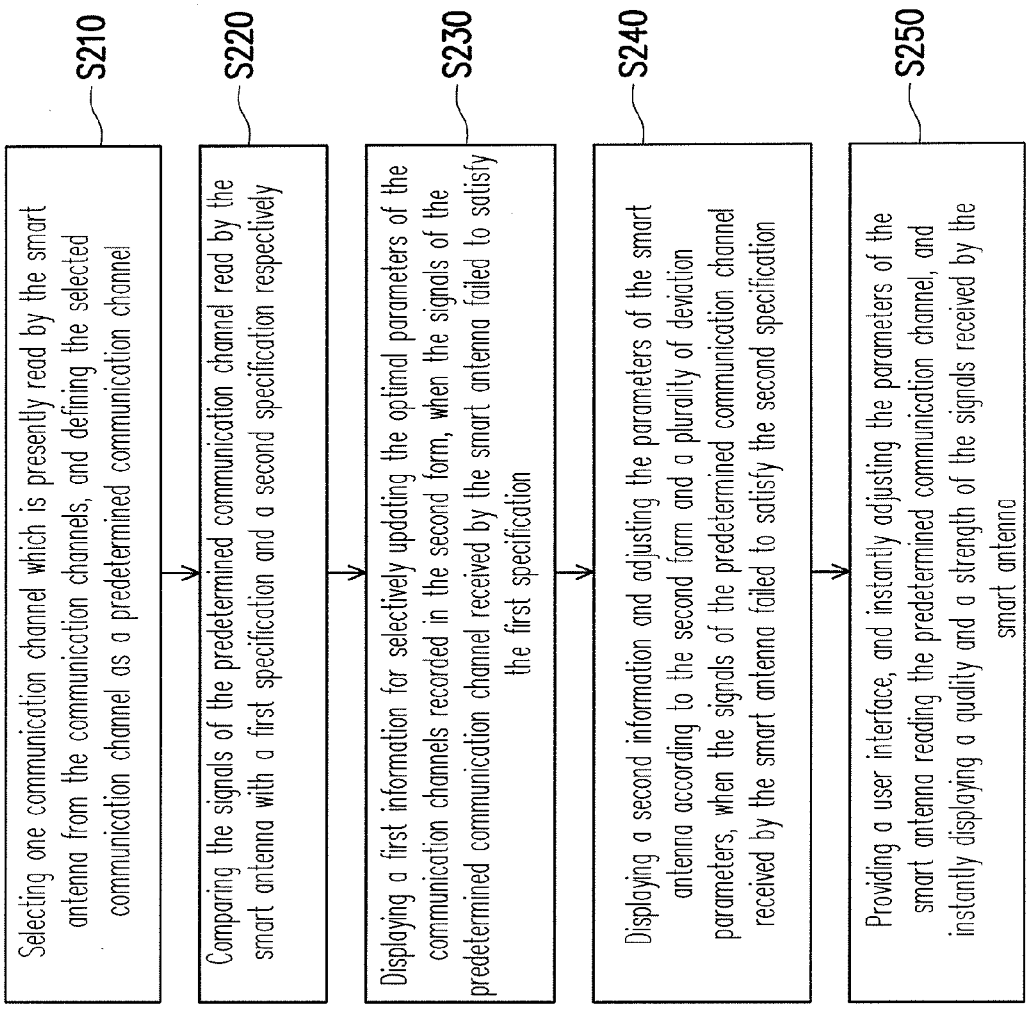
FIG. 2 is a flow chart illustrating another part of the adjusting method of the smart antenna according to an embodiment of the present invention.

After obtaining optimal parameters of all of the communication channels, the smart antenna can set each of the communication channels according to the second form, so as to achieve an improved signal receiving performance. Further, as shown in FIG. 2, in order to avoid the affection of environmental variation and time, the present invention further employs steps S210 to S230 for further adjusting the smart antenna. FIG. 2 is a flow chart illustrating another part of the adjusting method of the smart antenna according to an embodiment of the present invention.

Referring to FIG. 2, first at step S210, a communication channel that is presently read by the smart antenna is selected from a plurality of communication channels and defined as a predetermined communication channel. Then, at step S220, signals of the predetermined communication channel read by the smart antenna are compared with a first specification (for example can be the predetermined specification of the foregoing embodiment), and a second specification, respectively, for instantly determining the signal receiving performance of the smart antenna. The first specification and the second specification for example are defined according to a packet error rate (PER) of the signals.

Figure 3:
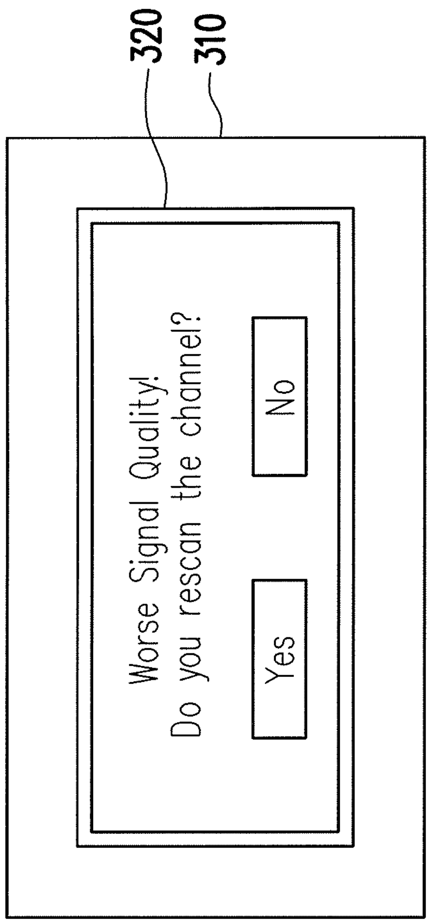
FIG. 3 is a schematic diagram illustrating a displayed image of step S230 according to an embodiment of the present invention.

Then, at step S230, when the signals of the predetermined communication channel read by the smart antenna fail to satisfy the first specification, which means the signal receiving performance is very poor, in which serious mosaics are displayed in the image. Meanwhile, as shown in FIG. 3, at step S230, a first information 320 will be displayed in a frame of screen 310. Hence, the user is allowed to select whether to update the optimal parameters of the communication channels recorded in the second form (selectively repeating steps S110 to S160), by the first information 320. Correspondingly, the smart antenna regulates the parameters of the predetermined communication channels, thus obtaining an improved signal receiving performance.

Figure 4:
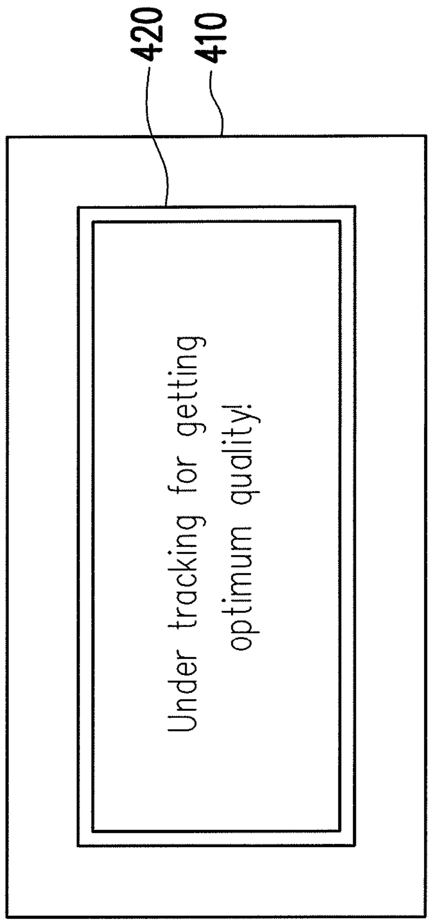
FIG. 4 is a schematic diagram illustrating a displayed image of step S240 according to an embodiment of the present invention.

Further, at step S240, when the signals of the predetermined communication channel read by the smart antenna fail to satisfy the first specification that means the signal receiving performance is acceptable, while having some distorted portions or slight mosaics. In this case, as shown in FIG. 4, at step S240, a second information 420 will be displayed in a frame of screen 410, and the parameters of the smart antenna are to be adjusted according to the second form and a plurality of deviation parameters. Details of the step S240 are to be further discussed herebelow.

Figure 5:
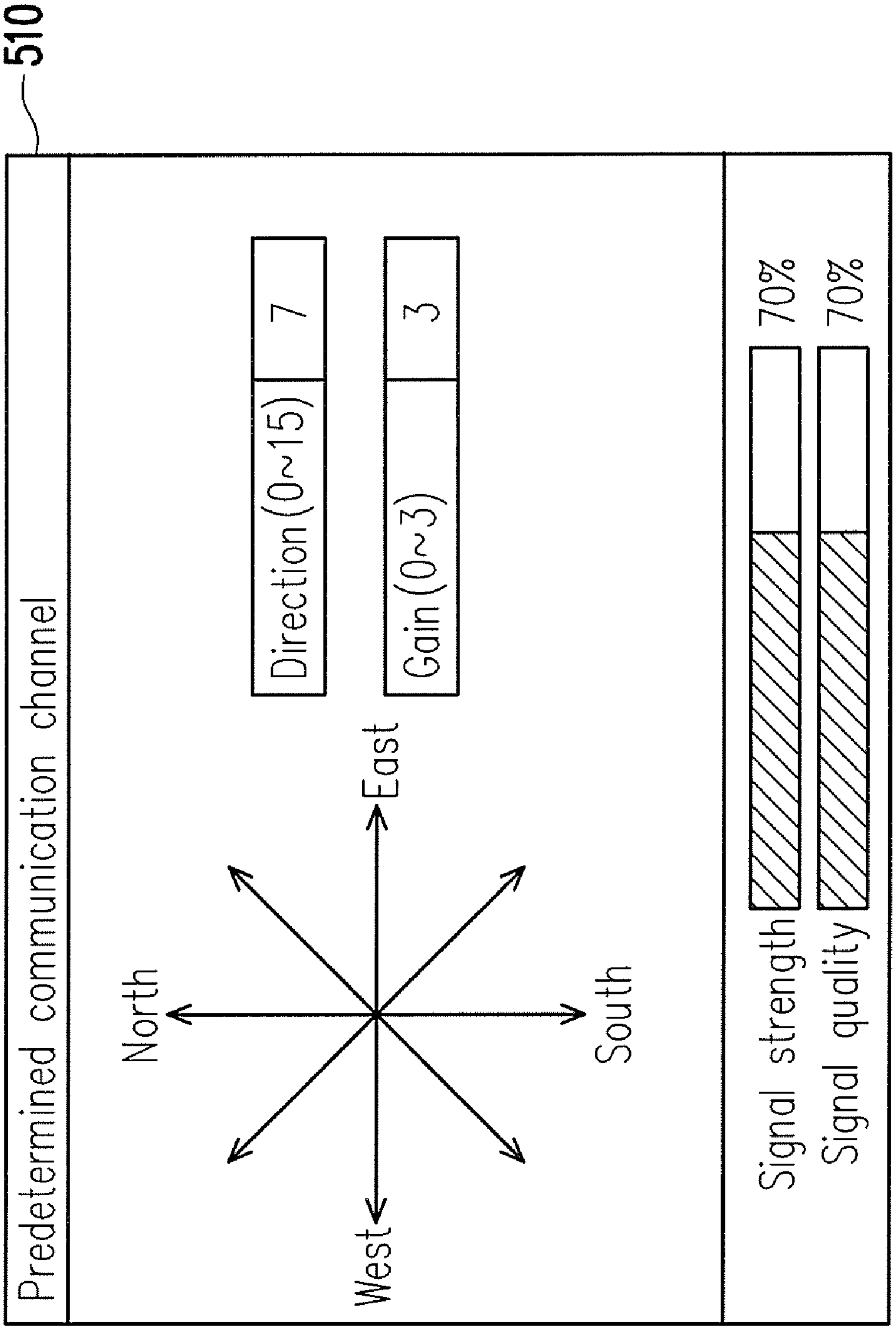
FIG. 5 is a schematic diagram illustrating a user interface of step S250 according to an embodiment of the present invention.

Further, at step S250, a user interface is provided. Therefore, the user is allowed to use the user interface for instantly adjusting the parameters of the smart antenna for reading the predetermined communication channel. For example, as shown in FIG. 5, the user is allowed to adjust a direction and a gain of the smart antenna via a user interface 510, in which the adjustable range of the direction is 0 to 15, and the adjustable range of the gain is 0 to 3. Further, at step S250, the quality and strength of the signals received by the smart antenna can also be displayed by the user interface. For example, presently, as shown in FIG. 5, the quality and strength of the signals received by the smart antenna are all 70%.

Figure 6:
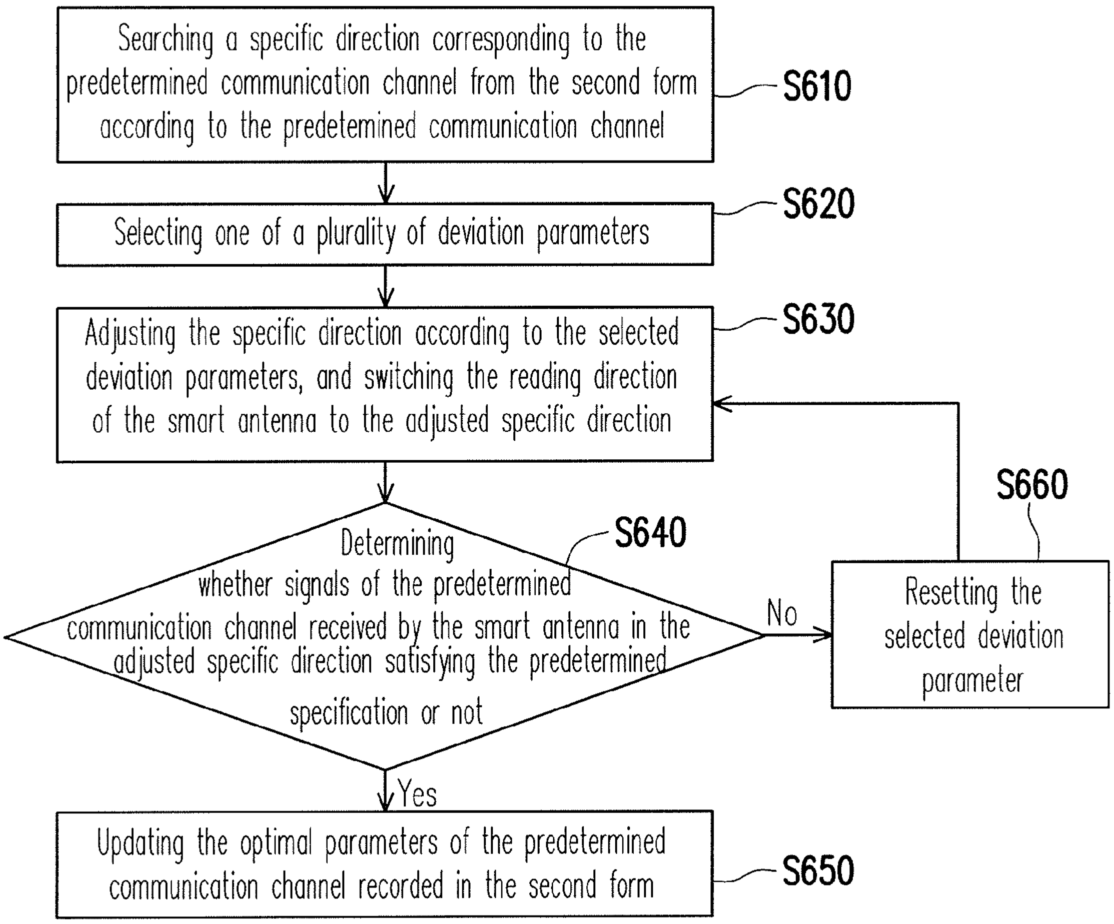
FIG. 6 is a flow chart for illustrating the step S240.

FIG. 6 is a flow chart for illustrating the step S240. Referring to FIG. 6, details of step S240 for adjusting the parameters of the smart antenna are illustrated. First, at step S610, a specific direction, which corresponding to the predetermined communication channel, is searched from the second form according to the predetermined communication channel. The searched specific direction is the reading direction presently set by the smart antenna. Then, at step S620, one of the deviation parameters is selected. In addition, at step S630, the selected deviation parameters is used for adjusting the specific direction, and the reading direction of the smart antenna is switched to the adjusted specific direction.

For example, if the adjustable range of direction of the smart antenna is 0 to 15, and the deviation parameters include {−3, −2, −1, 0, 1, 2, 3}, the minimum scale for adjusting the direction of the smart antenna is 360°/16=22.5°. Further, if the selected one of the deviation parameters is −2, then the specific direction will be deviated for −2*22.5°=−45°. Correspondingly, the reading direction of the smart antenna will be deviated to a −45° in the specific direction comparing with the original direction of the smart antenna.

After the smart antenna is adjusted according to the selected deviation parameters, at step S640, it is determined whether signals of the predetermined communication channel received by the smart antenna in the adjusted specific direction satisfy the predetermined specification. When the signals of the predetermined communication channel received by the smart antenna in the adjusted specific direction satisfy the predetermined specification, which means the signals presently received by the smart antenna are featured with good signal receiving performance, and thus the optimal parameters of the predetermined communication channels recorded in the second form are to be updated.

Further, when the signals of the predetermined communication channel received by the smart antenna in the adjusted specific direction fail to satisfy the predetermined specification, step S660 will be executed, in which the selected deviation parameter is reset. Besides, the steps S630 to S650 are repeated for further fine-tuning the reading directions of the smart antenna with other deviation parameters, so as to update the optimal parameters of the predetermined communication channel. Correspondingly, as the optimal parameters of the predetermined communication channel are remained being updated, the smart antenna achieves an improved signal receiving performance.

In summary, the present invention divides all possible reading directions of the smart antenna into a plurality of scanning directions and a plurality of idle directions by a first form. The first form is remained being updated by searching for the communication channels, and therefore the subsequently selected communication channel can be searched by referring previous searching results. In such a way, the present invention is adapted to effectively saving the time spent on the full frequency scanning process. Further, the present invention determines whether signals of a communication channel read by the smart antenna satisfy the first specification and the second specification for auto-tracking the status of the communication channels, and automatically tuning the optimal parameters of the communication channels.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adjusting method for a smart antenna, comprising:

obtaining a plurality of scanning directions and a plurality of idle directions according to a first form;

adjusting a reading direction of the smart antenna according to the scanning directions, and determining whether signals of a specific channel received by the smart antenna in the scanning directions satisfying a predetermined specification;

adjusting the reading direction of the smart antenna according to the idle directions so as to determine whether signals of the specific channel received by the smart antenna in the idle directions satisfying the predetermined specification, and updating the first form to allocate one of the idle directions to the scanning directions, when the signals of the specific channel received by the smart antenna in the scanning directions failed to satisfy the predetermined specification; and recording parameters of the smart antenna in a present condition in a second form as optimal parameters of the smart antenna for reading the specific channel, when the signals of the specific channel received by the smart antenna in the scanning directions satisfying the predetermined specification.

2. The adjusting method according to claim 1, further comprising:

selecting one of the communication channels serving as the specific channel to perform the steps of claim 1;

determining whether the communication channels have been selected one by one;

returning back to the step of selecting one of the communication channels, when the communication channels have not been selected one by one; and adjusting the smart antenna referring to the second form, when the communication channels have been selected one by one.

3. The adjusting method according to claim 2, further comprising:

selecting one communication channel which is presently read by the smart antenna from the communication channels, serving as a predetermined communication channel;

comparing signals of the predetermined communication channel received by the smart antenna with a first specification and a second specification respectively;

displaying a first information for selectively updating the optimal parameters of the communication channels recorded in the second form, when the signals of the predetermined communication channel received by the smart antenna failed to satisfy the first specification; and displaying a second information and adjusting the parameters of the smart antenna according to the second form and a plurality of deviation parameters, when the signals of the predetermined communication channel received by the smart antenna failed to satisfy the second specification.

4. The adjusting method according to claim 3, further comprising:

providing a user interface;

instantly adjusting the parameters of the smart antenna reading the predetermined communication channel; and instantly displaying a quality and a strength of the signals received by the smart antenna.

5. The adjusting method according to claim 3, wherein the step of adjusting the parameters of the smart antenna according to the second form and the plurality of deviation parameters comprises:

searching a specific direction corresponding to the predetermined communication channel from second form according to the predetermined communication channel;

selecting one of the deviation parameters;

adjusting the specific direction according to the selected deviation parameter, and switching the reading direction of the smart antenna to the adjusted specific direction;

determining whether signals of the predetermined communication channel received by the smart antenna from the adjusted specific direction satisfying the predetermined specification; and when the signals of the predetermined communication channel received by the smart antenna in the adjusted specific direction satisfying the predetermined specification, updating the optimal parameters of the predetermined communication channel recorded in the second form; or when the signals of the predetermined communication channel received by the smart antenna in the adjusted specific direction failed to satisfy the predetermined specification, resetting the selected deviation parameter and repeating the above-mentioned steps subsequent to the step of selecting one from the deviation parameters.

6. The adjusting method according to claim 1, wherein the step of adjusting the reading direction of the smart antenna according to the scanning directions and determining whether signals of the specific channel received by the smart antenna from the scanning directions satisfying the predetermined specification comprises:

selecting one of the scanning directions;

adjusting the parameters of the smart antenna for switching the reading direction of the smart antenna to the selected scanning direction;

determining whether signals of the specific channel received by the smart antenna in the selected scanning direction satisfying the predetermined specification;

determining whether the scanning directions have been selected one by one, when the signals of the specific channel received by the smart antenna in the selected scanning direction failed to satisfy the predetermined specification; and resetting the selected scanning direction and repeating the above steps subsequent to the step of selecting one of the scanning directions until all of the reading directions of the smart antenna are switched to the scanning directions one by one, when the scanning directions have not yet been selected one by one.

7. The adjusting method according to claim 1, wherein the step of adjusting the reading direction of the smart antenna according to the idle directions so as to determine whether signals of the specific channel received by the smart antenna in the idle directions satisfying the predetermined specification, and updating the first form to allocate one of the idle directions to the scanning directions further comprises:

selecting one of the idle directions, when all of the scanning directions have been selected one by one;

adjusting the parameters of the smart antenna to switch the reading direction of the smart antenna to the selected idle direction;

determining whether signals of the specific channel received by the smart antenna in the selected idle direction satisfying the predetermined specification or not;

resetting the selected idle direction, and repeating the above steps subsequent to the steps of selecting one of the idle directions, when the signals of the specific channel received by the smart antenna in the selected idle direction failed to satisfy the predetermined specification; and setting the selected idle directions as one of the scanning directions, when the signals of the specific channel received by the smart antenna in the selected idle direction satisfying the predetermined specification.

8. A full frequency scanning method, suitable for a smart antenna, the full frequency scanning method comprising:

scanning signals of a first channel from a first direction of an idle direction;

determining whether signals received by the smart antenna satisfying a predetermined specification;

scanning signals of the first channel from a second direction of the idle direction, and repeating the step of determining whether signals received by the smart antenna satisfying the predetermined specification, when the signals received by the smart antenna failed to satisfy the predetermined specification;

setting the first direction as a scanning direction, and recording the first direction in a first form, when the signal received by the smart antenna satisfies the predetermined specification;

scanning signals of a second channel next to the first channel according to the scanning direction recorded in the first form;

determining whether signals of the second channel received by the smart antenna from the scanning direction satisfying the predetermined specification;

scanning signals of the second channel from the second direction of the idle direction, when the signals of the second channel received by the smart antenna from the scanning direction failed to satisfy the predetermined specification; and repeating the step of scanning signals of a next channel until all of the channels are scanned, when the signals of the second channel received by the smart antenna from the scanning direction satisfying the predetermined specification.

9. The full frequency scanning method according to claim 8, wherein an amount of the scanning direction is one or more, and the step of scanning signals of the second channel next to the first channel, according to the scanning direction recorded in the first form, further comprises:

scanning the scanning directions one by one and determining whether the signals of the second channel satisfying the predetermined specification;

proceeding the step of searching the idle directions when the signals of the second channel of all of the scanning directions failed to satisfy the predetermined specification; and proceeding the step of scanning the next channel when the signals of the second channel received from one of the scanning directions satisfying the predetermined specification.

10. A channel parameter adjusting method, suitable for a smart antenna, the channel parameter adjusting method comprising:

recording parameters of the smart antenna in a second form serving as optimal parameters of a specific channel, when signals of the specific channel read by the smart antenna satisfying a first specification;

determining whether the signals of the specific channel under the optimal parameters satisfying a second specification;

displaying a first information, and adjusting the parameters of the smart antenna according to the second form and a plurality of deviation parameters, when the signals of the specific channel under the optimal parameters failed to satisfy the second specification; and remaining the parameters of the smart antenna unchanged when the signals of the specific channel under the optimal parameters satisfying the second specification.

11. The channel parameter adjusting method according to claim 10, further comprising:

displaying a second information for selectively updating the optimal parameters of a plurality of communication channels recorded in the second form when the specific channel under the optimal parameters unsatisfying the second specification any more.

* * * * *